United States Patent [19]

Wilkens et al.

[11] Patent Number: 4,487,094
[45] Date of Patent: Dec. 11, 1984

[54] TURNBUCKLE RATCHET TIGHTENING TOOL

[76] Inventors: Robert A. Wilkens, 202 S. 5th St.; Michael F. Robbins, 406 N. 3rd St., both of Oquawka, Ill. 61469

[21] Appl. No.: 463,748

[22] Filed: Feb. 4, 1983

[51] Int. Cl.³ .............................................. B25B 13/46
[52] U.S. Cl. .................................... 81/57.39; 81/57.4; 81/57.46
[58] Field of Search ................... 81/57.39, 57.46, 57.4, 81/57.41, 57.33, 57.34, 57.35, 57.54, 57.12, 57.13, 57.14, 57.15, 57.16, 57.17, 57.29, 57.30

[56] References Cited

U.S. PATENT DOCUMENTS

| | | | |
|---|---|---|---|
| 2,475,606 | 7/1949 | Gagnon | 81/57.29 |
| 3,585,884 | 6/1971 | Leckie | 81/53 R |
| 4,376,396 | 3/1983 | Hayhoe | 81/57.14 |
| 4,381,685 | 5/1983 | Brooks | 81/57.29 |
| 4,399,721 | 8/1983 | Jedlicka | 81/57.46 |

FOREIGN PATENT DOCUMENTS 82355  1/1935  Sweden ........................... 81/57.39

Primary Examiner—James L. Jones, Jr.
Attorney, Agent, or Firm—Anthony T. Lane; Robert P. Gibson; Robert O. Richardson

[57] ABSTRACT

A turnbuckle ratchet tightening tool which is used in rapidly tightening and loosening barge turnbuckles used with lashing lines to lash a plurality of barges together. The tool has an extendable overcenter lock holder that fits over the turnbuckle that is resting on roller supports. The turnbuckle carrier body is free to rotate. A foot operated lever is ratchet connected to an enlarged actuator whose teeth engage the teeth on the turnbuckle carrier body. In this manner, downward movement of the foot operated lever rotates the actuator which in turn rotates the turnbuckle carrier body in its holder.

9 Claims, 5 Drawing Figures

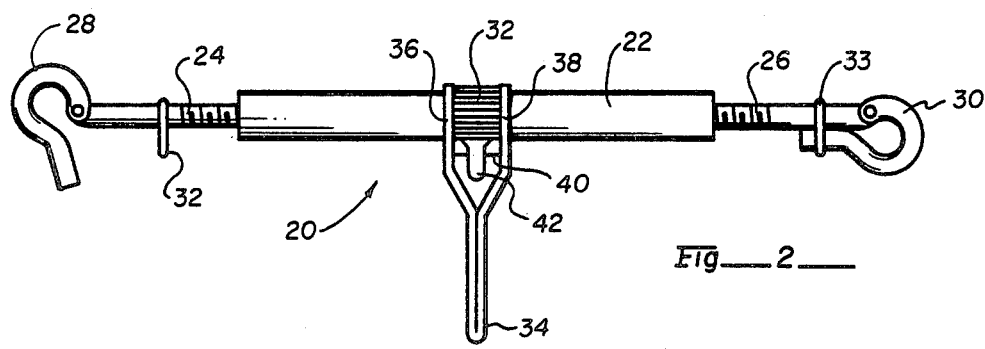
Fig__2__
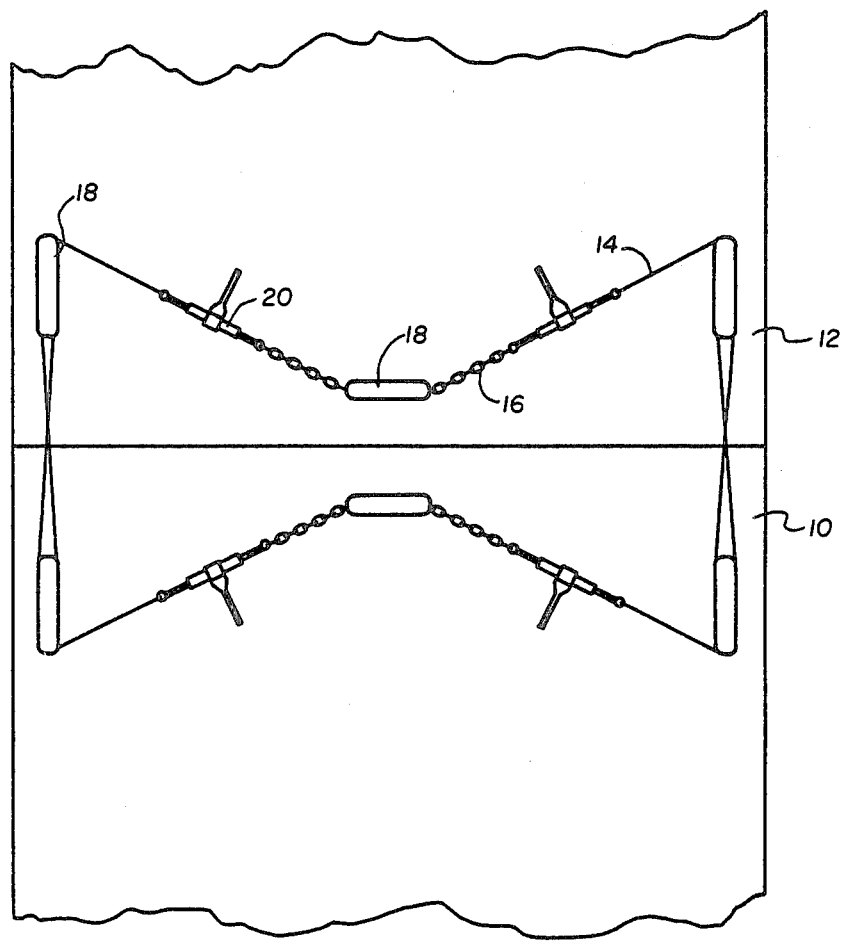
Fig__1__

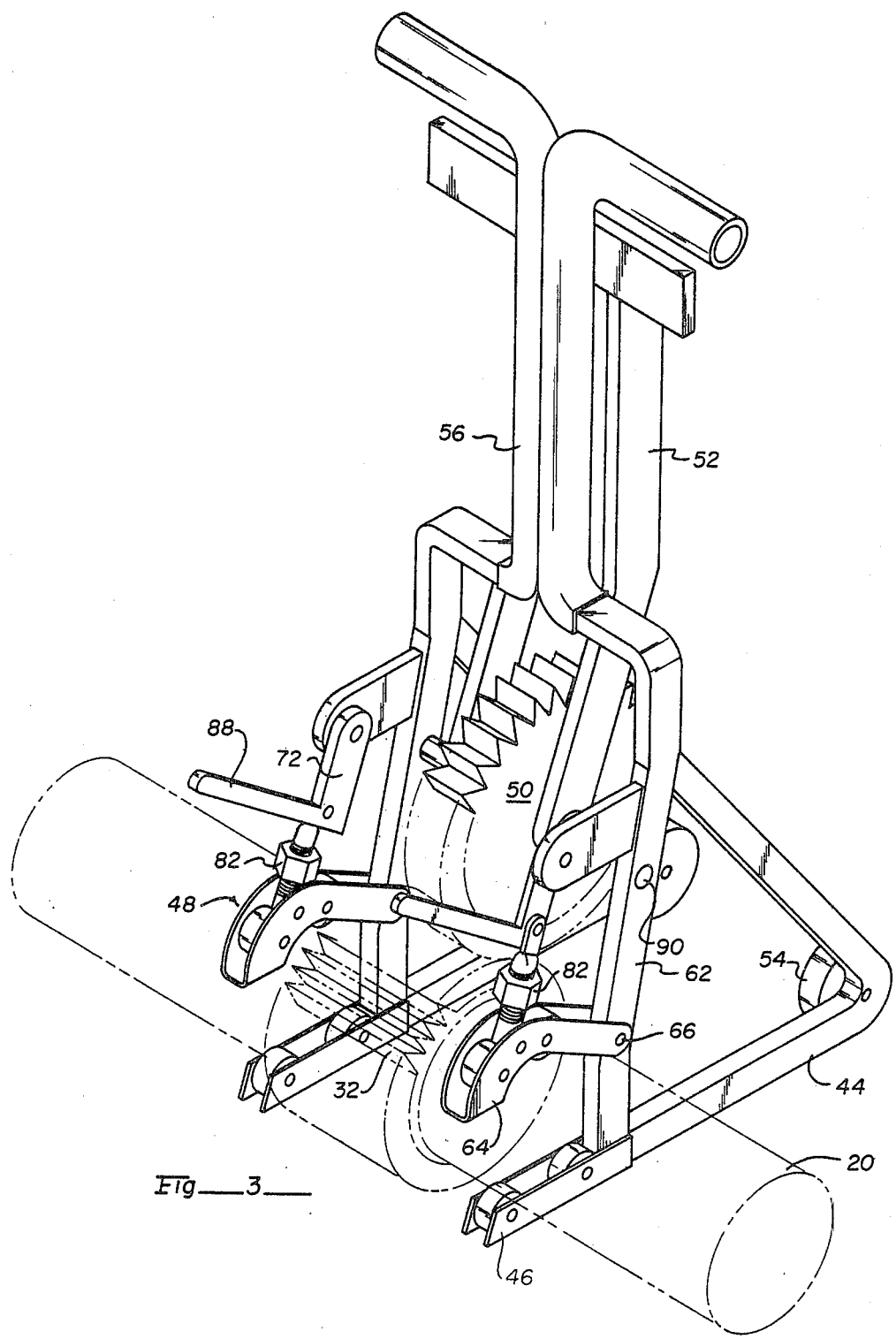
Fig__3

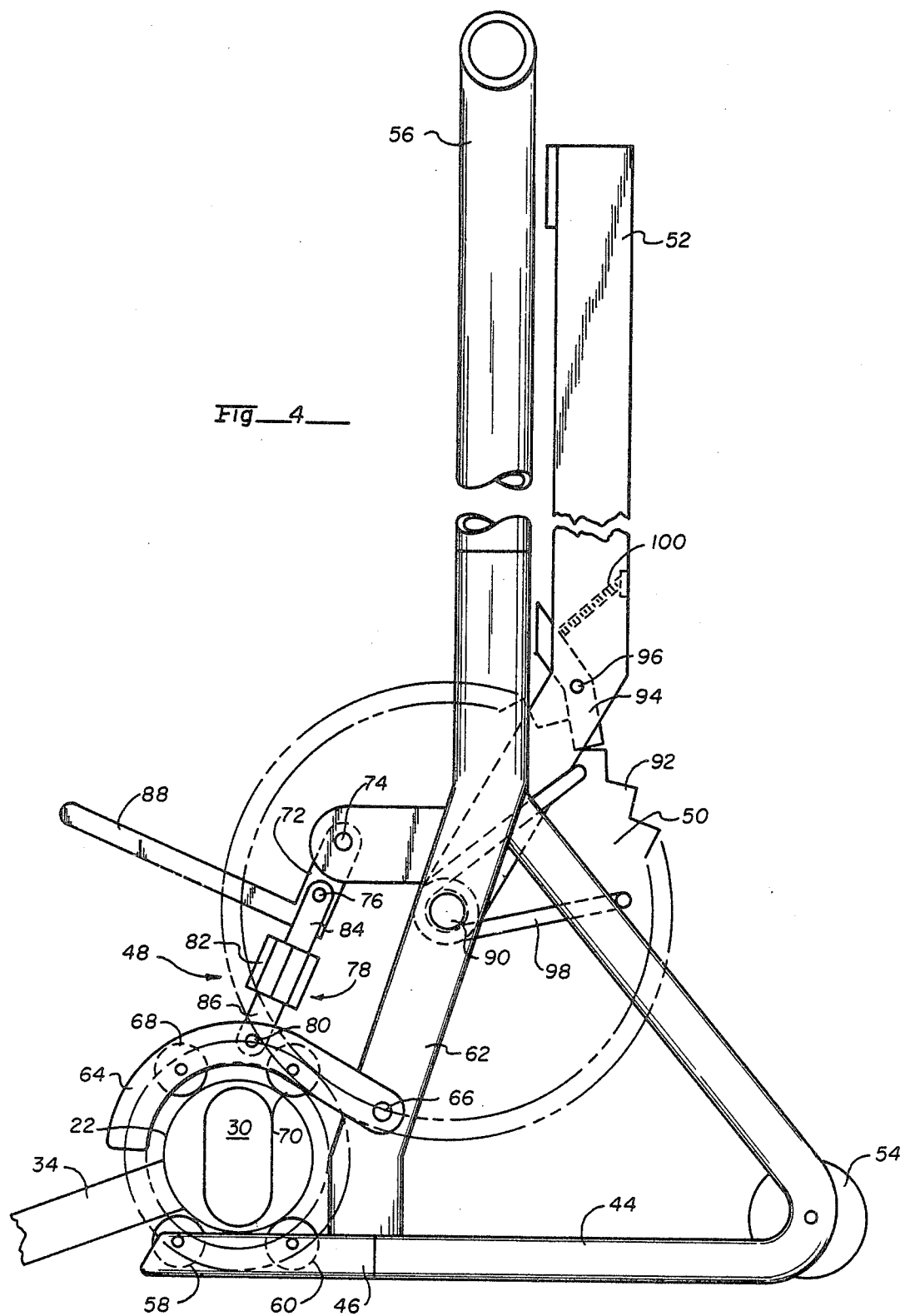
Fig_4

4,487,094

TURNBUCKLE RATCHET TIGHTENING TOOL

GOVERNMENT INTEREST

The invention described herein may be manufactured and/or used by or for the Government for governmental purposes without the payment of any royalty thereon.

BACKGROUND OF THE INVENTION

Barges are lashed together and pushed by tugs as a means of river transportation of bulk items such as grain, coal, sand, ore, and similar cargo. In order to navigate properly the barges must be lashed taut so they can be maneuvered around bends in a river, through locks and follow navigational channels. These barges typically are bound together with cable or chains passing around and between levels on the various barges. Interspersed along the lines are turnbuckles which are used for tightening the lines when connecting barges together and loosening them for removal when disconnecting the barges.

Barge turnbuckles have a ratchet mechanism on them with a stem over which a pipe handle may be attached for leverage in rotating the turnbuckle in the tightening and loosening operations. This ratchet turnbuckle operating mechanism, while it has a high mechanical advantage, requires a lot of physical exertion, particularly in the use of arm and back muscles of the operator. In rearranging a typical string of 15 barges, as many as 24 ratchet mechanisms must be loosened and then tightened just to go through a three barge wide, three barge long lock, for example. Then the operation is reversed and the barges rearranged for towing to the next lock. Thus, a lot of work is involved just navigating the 29 locks along the Mississippi River.

SUMMARY OF PRESENT INVENTION

The present invention provides for the rotation of a turnbuckle to tighten and loosen barge connecting cables through the use of operator hand and/or foot power and the weight of the operator, thus easing his burden of work. In addition, lockage time is reduced, providing a saving in river transportation costs. Briefly, a ratchet gear is provided that mates and engages with the ratchet on the barge turnbuckle. An over center quick connect/disconnect holds the two gears in connected position. A foot operated actuator rotates the ratchet gear and thus the ratchet gear on the turnbuckle. Since the turnbuckle turns with its ratchet gear, the barge connecting lines are quickly and easily tightened and/or loosened as desired by the operator. He can do his work quicker and easier with the tightening tool of this invention than he can without it.

BRIEF DESCRIPTION OF DRAWINGS

FIG. 1 is a plan view of a typical lash up of a pair of barges,

FIG. 2 is a plan view of a conventional turnbuckle with which the tool of this invention is used, FIG. 3 is a perspective view of the turnbuckle ratchet tightening tool, with the turnbuckle shown in phantom lines, FIG. 4 is a side elevational view of the tool.

DETAILED DESCRIPTION OF PREFERRED EMBODIMENTS

Figure 5:
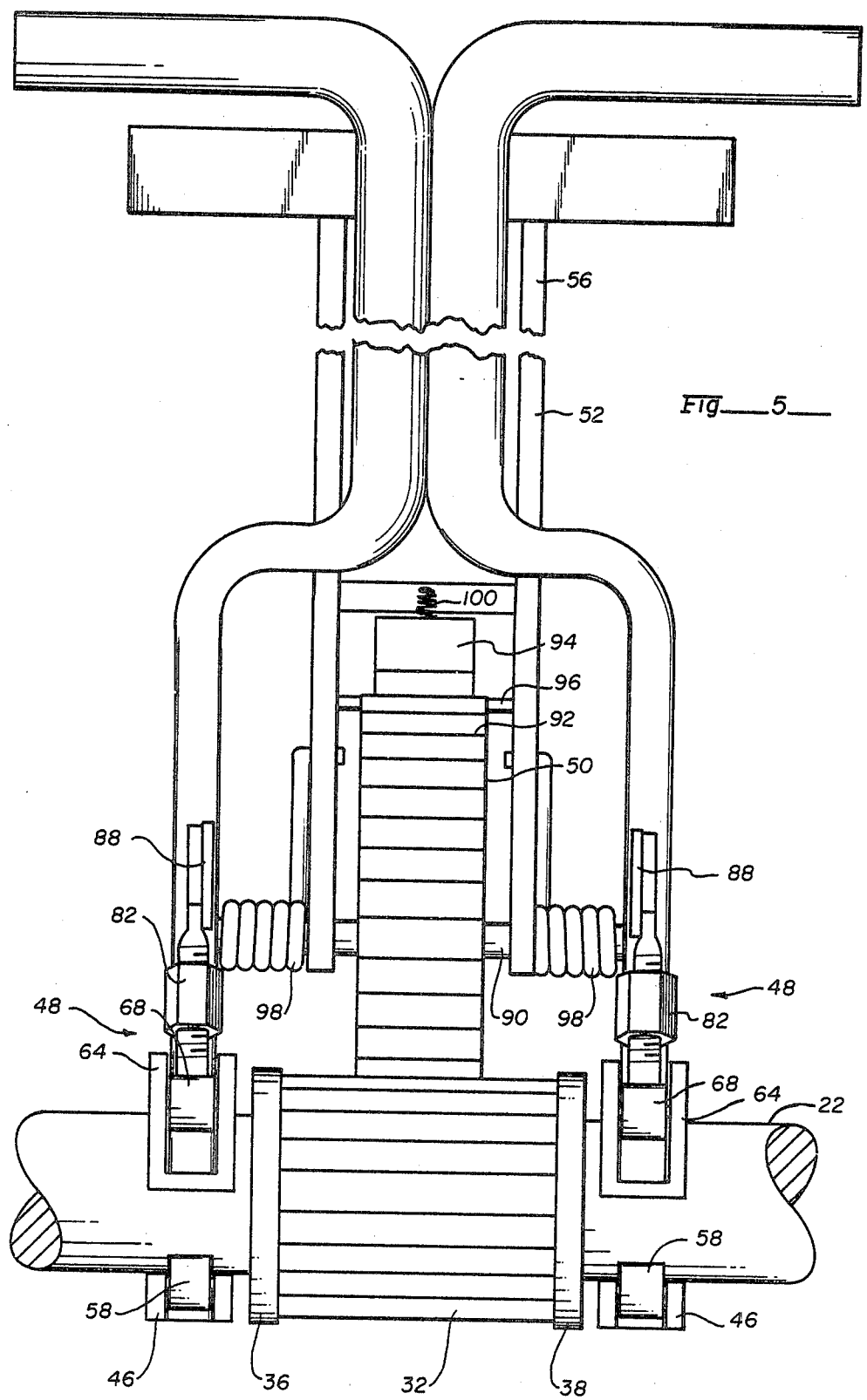
FIG. 5 is a front elevational view.

Reference is had to FIG. 1 wherein is shown the front end of the deck of barge 10 lashed to the rear end of the deck of barge 12 by means of cables 14 and chains 16, wound around kevels 18 on the decks. Disbursed throughout the lash up are a plurality of turnbuckles 20 used to tighten the lines and thus draw the barges firmly together. One such turnbuckle is shown in FIG. 2.

Turnbuckle 20, as presently used in lashing barges, consists of a carrier body 22 having oppositely threaded, eye-bolts 24, 26 engageable at each end. In a conventional and well known manner, rotation of the carrier body 22 in one direction moves the eye-bolts 24, 26 inwardly and rotation of the carrier body in the opposite direction moves the eye-bolts outwardly. Operation of the turnbuckle requires relative rotation between the carrier body and the eye-bolts. Rotation of the eye-bolts with the turnbuckle can be prevented by attaching a pipe or rod, not shown, through the eye-bolt with its axis at right angles to the axis of the turnbuckle. This pipe or rod makes contact with the barge deck to prevent eye-bolt rotation. The outer ends of the eye-bolts have pivotal loops 28, 30 and locking rings 32, 33. The loops accommodate the ends of cables and chains whih are drawn together for tightening and moved apart for loosening. Loop 28 and locking ring 32 are shown in the unlatched position and loop 30 and locking ring 33 are shown in locked position.

The barge type turnbuckle 20 has a ratchet feature for rotating the carrier body 22. This includes ratchet teeth 32 around the carrier body 22 and a torque handle 34 rotatably attached to the carrier body. A pair of legs 36, 38 have apertures (not shown) through which the carrier body 22 rotates. Between the legs is a pin 40 on which a latching member 42 pivots. As shown in FIG. 2 when handle 34 is raised (in a direction away from the drawing and toward the observer) the latching member 42 rides over the ratchet teeth 32 to a new position. Downward movement of handle 34 (in the reverse direction away from the observer and toward the drawing) causes the latch to engage the ratchet teeth and rotate the carrier body. As the turnbuckle tightens the lines, rotation of torque handle 34 becomes more difficult. This difficulty is presently overcome by inserting a length of pipe over the handle for additional leverage. Although the use of a pipe to extend the effective length of the torque handle is helpful, it requires arm exertion of the operator. The turnbuckle ratchet tightening tool of the present invention as shown in FIGS. 3, 4, and 5 replaces operator arm power with leg power and the weight of the operator for faster and easier operation.

Reference is made to the perspective view of the turnbuckle ratchet tightening tool shown in FIG. 3. It consists of a base frame 44 having a turnbuckle support 46 at its front end and an overcenter lock holder 48 to maintain a turnbuckle in rotatable position. A ratchet teeth engagement actuator 50 mounted on the frame engages the ratchet teeth 32 of the turnbuckle to effect its rotation. Also pivotally mounted on frame 44 is a foot operated actuator 52. When this actuator 52 is depressed, it rotates actuator 50 which in turn rotates the turnbuckle 20. Wheels 54 and transport handle 56 facilitate moving the turnbuckle ratchet tightening tool about the barge deck. To reverse the rotation of the turnbuckle carrier body 22, the tool is simply turned around to face the opposite direction when engaging the turnbuckle. In this manner the downward movement of the foot operated actuator will loosen or tighten the turnbuckle, as desired.

FIG. 4 is a side elevational view of the ratchet tightening tool of the present invention. Here there is shown a base frame 44 with wheels 54 at the rear and the turnbuckle support 46 at the front. This support includes a pair of rollers 58, 60 adapted to cradle the carrier body 22 of the turnbuckle 20 such as shown in FIG. 2. These rollers are raised from the barge deck so that they may roll freely. As shown in FIG. 3 the frame 44 has spaced legs 62 and turnbuckle supports to support the carrier body on both sides of its ratchet teeth 32. Also shown in FIG. 3, the overcenter lock holder 48 consists of two clamping devices, one on each leg 62 and adapted to engage the turnbuckle carrier body over the turnbuckle supports 46. Each clamping device has an arcuate bracket 64 pivotally mounted at 66 to leg 62. Each bracket has a pair of rollers 68, 70 adapted to engage carrier body 22 when the overcenter lock holder 48 is in the operable position shown in FIG. 4. This operable position is maintained by the overcenter lock which consists of a lever arm 72 pivotally mounted at 74 to frame 44 and at 76 to an extendable lever arm 78. This extendable lever arm 78 is pivotally attached to bracket 64 at pivot 80. The extendable lever arm 78 has an adjusting nut 82 between bolts 84, 86 which are reverse threaded. As nut 82 is rotated in one direction it draws the bolts together to shorten the length of lever arm 78 between points 76 and 80. When nut 82 is rotated in the opposite direction it moves the bolts apart, lengthening the distance between points 76 and 80. This adjustment can be made when the overcenter lock holder is in the operable position shown in FIG. 4.

Lever arm 72 has a release handle 88 attached. Upward movement of handle 88 moves the arcuate bracket 64 upwardly to free the tool from its engagement with the turnbuckle carrier body 22. Downward movement of the handle 88 to the position shown, locks the holder 48 over the carrier body 22 as it is positioned on turnbuckle support 46, as shown.

Between the spaced legs 62 is a turnbuckle ratchet teeth engagement actuator 50 rotatable mounted at 90 to the spaced legs. This actuator has teeth 92 thereon which are engageable with the ratchet teeth 32 on the turnbuckle carrier body 22. The diameter of the actuator is about eight inches or twice that of the turnbuckle. Thus, the turnbuckle will rotate at about twice the speed of rotation of the actuator 50. This is a considerable convenience and is easier and faster than the old method of pumping the torque handle 34 on the carrier body 22. It should be noted that the torque handle 34 is not needed with this tool but it also does not hinder the tool operation.

Rotation of actuator 50, and hence the turnbuckle carrier body 22, is done with the foot operated actuator 52. It is pivotally mounted at 90 to the base frame legs 62. A spring loaded ratchet dog 94, pivotally mounted at 96 on foot operated actuator 52 to cause its rotation of actuator 50 when actuator 52 is depressed. Spring 98 on frame 44 engages actuator 52 and automatically raises it to the position shown when the foot pumping action on actuator 52 is completed.

Reference is now made to the front view of the tightening tool as shown in FIG. 5. Here is shown the turnbuckle carrier body 22 with ratchet teeth 32 between the legs 36, 38 which attach the torque handle (not shown) to the carrier body 22. The carrier body 22 is resting on rollers 58, and 60 (not shown) on the turnbuckle supports 46 and the overcenter lock holder 48 is in operating position. The arcuate brackets 64 are down in operating position with their rollers 68 (and 70 not shown) engaging the carrier body 22. The teeth 92 of actuator 50 engage the teeth 32 of the carrier body 22. The foot operated actuator 52 is shown behind transport handle 56. Springs 98 on axle pin 90 urge it upwardly, ready for operation. Spring 100 engages ratchet dog 94 on pivot 96 with teeth 92 on actuator 50 to cause rotation of the actuator 50.

The invention in its broader aspects is not limited to the specific combinations, improvements and instrumentalities described but departures may be made therefrom within the scope of the accompanying claims without departing from the principles of the invention and without sacrificing its chief advantages.

What is claimed is:

1. In combination with a turnbuckle having a carrier body with ratchet teeth about its periphery, a tool having a base frame,
    a ratchet teeth engaging actuator rotatably mounted on said frame with teeth thereon engageable with said ratchet teeth on said carrier body,
    retaining means on said frame to rotatably retain said carrier body thereon,
    a foot operated actuator pivotally mounted on said frame, and ratchet means interconnecting said foot operated actuator with said teeth engaging actuator to cause rotation thereof.

2. In combination with a turnbuckle, a tool as set forth in claim 1 wherein said retaining means to rotatably retain said carrier body includes first pairs of rollers upon which said carrier body may be positioned and revolved and second pairs of rollers which may be positioned over and on said carrier body.

3. In combination with a turnbuckle, a tool as set forth in claim 2 wherein said second pairs of rollers are attached to an arcuate bracket pivotally mounted on said frame.

4. In combination with a turnbuckle, a tool as set forth in claim 3 wherein said retaining means includes means releasably retaining said second pairs of rollers on said carrier body.

5. In combination with a turnbuckle, a tool as set forth in claim 4 wherein said means includes a lever arm pivotally attached to said base frame an extendable lever arm pivotally attached to said arcuate bracket, said lever arm and said extendable lever arm being pivotally attached to each other.

6. In combination with a turnbuckle, a tool as set forth in claim 5 wherein a release handle is attached on one of said lever arms to align said lever arms in overcenter locking position.

7. In combination with a turnbuckle, a tool as set forth in claim 5 wherein said extendable lever arm comprises a pair of reverse threaded bolts with an adjusting nut in between, whereby rotation of said nut in one direction draws said bolts together and rotation in the opposite direction moves said bolts apart.

8. In combination with a turnbuckle, a tool as set forth in claim 1 wherein said ratchet teeth engaging actuator has a diameter of approximately twice that of said turnbuckle carrier body to thereby increase the speed of rotation of said carrier body.

9. In combination with a turnbuckle, a tool as set forth in claim 1 wherein said base frame has a handle and wheels thereon to facilitate its portability.

* * * * *